(12) United States Patent
Jacob (10) Patent No.: US 6,758,536 B2
(45) Date of Patent: Jul. 6, 2004

(54) BRAKING SYSTEM FOR RAILROAD CAR/ SEMI-TRACTOR COMBINATION

(76) Inventor: Charles Jacob, P.O. Box 611, American Fork, UT (US) 84003

( * ) Notice: Subject to any disclaimer, the term of this patent is extended or adjusted under 35 U.S.C. 154(b) by 0 days.

(21) Appl. No.: 09/903,380

(22) Filed: Jul. 10, 2001

(65) Prior Publication Data

US 2002/0036428 A1 Mar. 28, 2002

Related U.S. Application Data

(63) Continuation-in-part of application No. 09/261,403, filed on Mar. 3, 1999, now Pat. No. 6,257,680.

(51) Int. Cl.$^7$ .............................................. B60T 13/00
(52) U.S. Cl. ......................... 303/7; 303/9.61; 303/123; 188/3 H
(58) Field of Search ................................ 303/7, 8, 123, 303/9.73, 9.61, 59, 66, 71, 81, 82; 188/3 R, 3 H, 33, 34, 41; 105/4.3, 159; 280/415.1, 423.1, 418.1

(56) References Cited

U.S. PATENT DOCUMENTS

| | | | |
|---|---|---|---|
| 3,424,502 A | | 1/1969 | Biabaud ........................ 303/7 |
| 3,910,646 A | * | 10/1975 | Grix ............................ 303/132 |
| 4,007,890 A | | 2/1977 | Bremer et al. ................. 244/50 |
| 4,049,324 A | * | 9/1977 | Cermak ....................... 188/3 R |
| 4,052,109 A | * | 10/1977 | Nagase et al. ................. 303/15 |
| 4,306,752 A | * | 12/1981 | Brandt ........................... 303/15 |
| 4,397,243 A | * | 8/1983 | Hickman .................... 104/32.1 |
| 4,405,271 A | * | 9/1983 | Adams ......................... 105/159 |
| 4,478,459 A | * | 10/1984 | Cumming .................... 303/15 |
| 4,553,788 A | * | 11/1985 | Smith .......................... 188/195 |
| 4,645,270 A | * | 2/1987 | Camm ........................... 303/25 |
| 4,838,618 A | * | 6/1989 | Blackmon, Jr. ............. 188/352 |
| 4,917,020 A | * | 4/1990 | Wicks et al. .............. 105/215.2 |
| 4,938,151 A | | 7/1990 | Viens ........................... 105/4.3 |
| 4,971,179 A | * | 11/1990 | Gebhardt et al. ........... 188/158 |
| 4,991,862 A | | 2/1991 | Tsao et al. .................... 280/421 |
| 5,020,862 A | * | 6/1991 | Balukin et al. ............... 303/15 |
| 5,022,714 A | * | 6/1991 | Breen ...................... 188/112 A |
| 5,090,779 A | * | 2/1992 | Kramer .................. 188/1.11 E |
| 5,163,474 A | * | 11/1992 | Rizk ...................... 137/596.17 |
| 5,372,413 A | * | 12/1994 | Broome et al. .......... 303/118.1 |
| 5,378,929 A | * | 1/1995 | Mor et al. ................... 188/353 |
| 5,383,717 A | | 1/1995 | Fernandez et al. ............. 303/3 |
| 5,403,073 A | * | 4/1995 | Frank et al. ............ 188/112 R |
| 5,429,424 A | | 7/1995 | Huber et al. ................... 303/2 |
| 5,480,042 A | | 1/1996 | Engle |
| 5,563,353 A | | 10/1996 | Ferri |
| 5,564,795 A | | 10/1996 | Engle ............................. 303/9 |
| 5,620,236 A | | 4/1997 | McGrath et al. ............... 303/7 |

(List continued on next page.)

FOREIGN PATENT DOCUMENTS

JP          274443 A     *   3/1990

*Primary Examiner*—Jack Lavinder
*Assistant Examiner*—Melody M. Burch
(74) *Attorney, Agent, or Firm*—Thorpe North & Western, LLP (57) ABSTRACT

A compressed air braking system for a railcar and railcar moving vehicle combination. The railcar moving vehicle comprises a modified semi-tractor configured to ride on railroad track and couple to a railcar. The railcar moving vehicle further includes means for producing compressed air at a desired pressure, means for transmitting the compressed air through an outlet conduit to the braking system of one or more coupled railcars, and brake actuation means whereby an operator may selectively release pressure in the outlet conduit to actuate the compressed air brakes of the railcar. The brake actuation means may comprise a plurality of electrically operated valves for selectively releasing pressure from the brake pipe of the connected railcar, and a multi-position electrical switch for activating the plurality of valves.

14 Claims, 5 Drawing Sheets

U.S. PATENT DOCUMENTS

| | | | | |
|---|---|---|---|---|
| 5,718,487 A | * | 2/1998 | Roselli et al. | 303/132 |
| 5,722,736 A | | 3/1998 | Cook | 303/15 |
| 5,738,416 A | | 4/1998 | Kanjo et al. | 303/7 |
| 5,808,370 A | | 9/1998 | Bezos | |
| 5,817,934 A | | 10/1998 | Skantar | |
| 5,823,638 A | | 10/1998 | Sich | 303/22.1 |
| 5,826,517 A | | 10/1998 | Larson, Jr. et al. | 105/4.3 |
| 5,927,822 A | * | 7/1999 | Hart | 303/7 |
| 5,927,823 A | * | 7/1999 | Dimsa et al. | 303/15 |
| 6,062,653 A | * | 5/2000 | Daugherty et al. | 303/15 |
| 6,257,680 B1 | * | 7/2001 | Jacob | 303/9.73 |

* cited by examiner

BRAKING SYSTEM FOR RAILROAD CAR/SEMI-TRACTOR COMBINATION

The present application is a continuation-in-part of U.S. patent application Ser. No. 09/261,403, now U.S. Pat. No. 6,257,680 filed on Mar. 3, 1999, for a BRAKING SYSTEM FOR RAILROAD CAR/SEMI-TRACTOR COMBINATION.

BACKGROUND OF THE INVENTION

1. Field of the Invention

This invention relates to braking systems for railcars. More particularly, the present invention relates to an improved braking system for a lightweight railcar moving vehicle comprising a modified semi-tractor wherein the braking system of the connected railcar(s) is connected to and actuated by the compressed air braking system of the semi-tractor.

2. State of the Art

In the railroad industry, maintenance of way is a critical activity and a major expense. Frequently, when maintenance is needed at a particular location along the right-of-way and heavy equipment or materials are required, a work train and crew are sent to that location to perform the needed repairs. For example, a work train may carry a load of railroad ties and short sections of rail for repairing track, along with heavy equipment for unloading and installing these items. Often, a work train consists of a locomotive pulling a single work car, and the maintenance work can be performed by one or two workers.

However, this approach can be very cost inefficient. Because maintenance of way crews and locomotive crews are differently trained and unable to perform each other's duties, the work train will frequently employ a crew much larger than actually needed at any given time. Obviously, this is costly. Furthermore, the use of a typical locomotive—which may cost in excess of a million dollars—to transport a single car and a few workers is extremely cost inefficient. For these reasons, it would be desirable to have a railcar moving vehicle that can pull one or a few railcars along the railroad track at mainline speeds, but that is not a conventional locomotive, and thus is not as costly as a locomotive, nor requires a full locomotive crew. With such a vehicle, a work crew could transport themselves to the work site with their materials and equipment, and perform the work with far less expense.

Additionally, it would be desirable to have such a railcar moving vehicle that is operable both on rails and on roadways. Such a vehicle would be valuable for maintenance of way crews by allowing a work crew to transport themselves and their equipment by highway to a rail siding, where the crew simply transfers their materials and equipment to a waiting railcar, and uses the semi-tractor on the rails to pull the railcar to the work site.

This sort of vehicle would have additional uses, as well. For example, many railroad customers have a need to move railcars and highway trailers within a rail yard or industrial siding. However, except for the largest industries, the cost to purchase and maintain a conventional switching locomotive is prohibitive or economically unwarranted. Thus, lightweight, multipurpose railcar moving vehicles have been developed and used to perform many functions normally assigned to switching locomotives, but which may also be used off the track to move trailers and containers about a switching yard or industrial site. Such modified or hybrid vehicles are more economical for many industries because of their relatively low cost and high versatility. They allow smaller industries to take advantage of the efficiency and economy of rail transport for heavy freight where otherwise they would not be able to do so.

However, conventional railcar moving vehicles are still relatively highly specialized, limited production vehicles. The cost per horsepower of these vehicles is significantly higher than the cost of a conventional semi-tractor, for example, which enjoys the cost advantages of much greater mass production. Additionally, conventional railcar moving vehicles are not designed or configured to operate on public highways as long or short haul trucks, but are confined to the industrial site or switching yard. Many of them do not have the functional and safety equipment required to be street legal, and are designed for low speed operation only, being unable to travel at speeds beyond 15 to 20 miles per hour. Moreover, they cannot operate at top speed for extended periods of time without overheating their hydraulic systems. To address these problems, railcar moving vehicles which are constructed from mass produced vehicles such as semi-tractors have been devised to reduce the acquisition cost and versatility of these vehicles.

Normally, the brakes of railroad cars are linked through a common line to the locomotive, which provides pressurized air to operate the braking system of all attached railroad cars. However, when a lightweight railcar moving vehicle such as a modified semi-tractor is coupled to a standard railcar, braking is a major concern. Because a single loaded railcar may weigh many times more than the lightweight railcar moving vehicle, the lightweight vehicle will be able to provide only a small fraction of the braking force needed for stopping in a reasonable distance, especially in an emergency. Obviously, it is desirable to utilize the railroad car brakes in order to take advantage of the weight of the railcar in braking. Conventional railcar moving vehicles known in the art do this by providing a compressed air link to the brake pipe of the connected railcar, thus using the railcar's braking system to stop.

Figure 1:
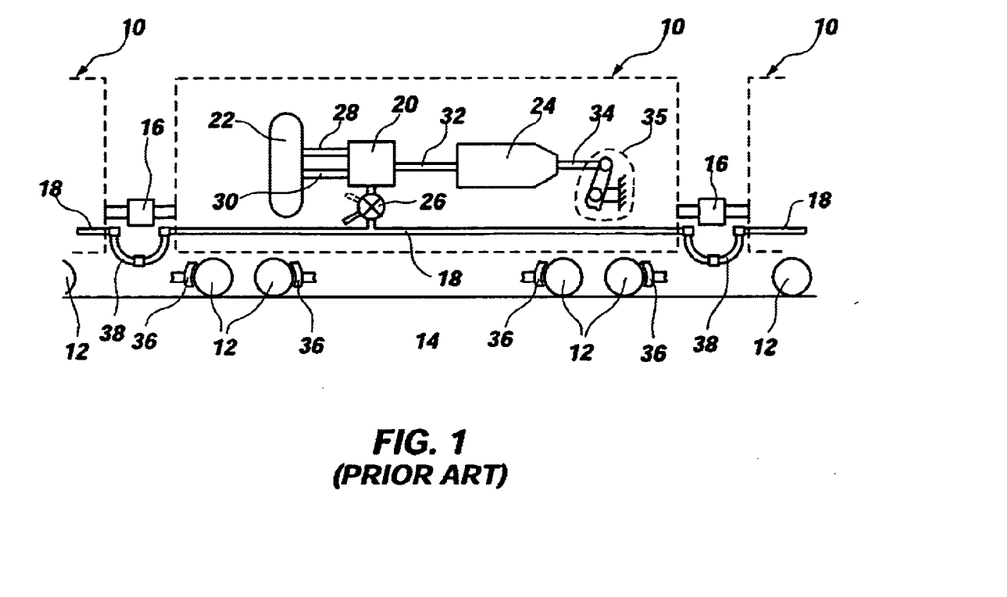
FIG. 1 is a schematic diagram of a conventional railcar braking system.

A schematic diagram of a conventional railroad car braking system is given in FIG. 1, which depicts a string of conventional railcars 10 having steel wheels 12 riding on steel rails 14, and coupled together by couplers 16. Each railroad car 10 has installed thereon a brake pipe 18, piston valve 20, reservoir 22, and brake cylinder 24. The brake pipe 18 is in fluid communication with the piston valve 20 through valve 26 which can be opened or closed to allow or prevent compressed air in the brake pipe 18 to pass. Under normal conditions, and as shown in FIG. 1, valve 26 is open. Two conduits 28 and 30 connect the piston valve 20 to the reservoir 22, and one similar conduit 32 connects the piston valve 20 to the brake cylinder 24. The brake cylinder 24 comprises an actuating rod 34 which extends from the cylinder and is axially reciprocally moveable depending on the pressure in the brake cylinder 24. This actuating rod 34 is connected via a mechanical linkage 35 (not shown in its entirety) to the individual brake actuators 36 on each wheel 12 of the railcar in a manner well known in the art.

The brake pipe 18 is connected to the brake pipes 18 of both preceding and following railcars 10, by flexible hoses 38. It will be appreciated that any railcar 10 may be connected to a locomotive and the brake pipe of the locomotive, rather than another railcar, in the same manner. The typical railcar braking system thus shown operates in the following manner. The locomotive provides compressed air to the brake pipe 18 which communicates along the entire length of the train. Railcar braking systems typically maintain a running pressure of 90 psi in the brake pipe and associated components. With valve 26 open, this operating pressure is maintained within piston valve 20, conduit 28, and reservoir 22. In a non-braking condition, the pressure in conduit 32 is less than that in the brake pipe and other components mentioned, and is approximately equal to atmospheric pressure.

To actuate the brakes of the railcar, the locomotive engineer moves a brake actuating lever (not shown) which opens a valve to allow pressure to escape from the bake pipe 18. Because the brake pipes of all connected railcars are in fluid communication, this action simultaneously releases the pressure in the brake pipes of all connected railcars. When pressure is released from the brake pipe 18, the change in pressure actuates the piston valve 20 to close off its connection to the brake pipe, and simultaneously release compressed air from the reservoir 22, through conduit 30, thence into conduit 32 and the brake cylinder 24. This actuation thus prevents compressed air from reservoir 22 from escaping through the brake pipe, but sends it instead to the brake cylinder 24. Pressurization of brake cylinder 24 in turn causes actuating rod 34 to extend, thus mechanically actuating the brakes 36 of the railcar.

To release the brakes, the system must regain its operating pressure. This requires that the engineer move the brake lever back to the position which will close the release valve, so that the compressor on the locomotive may repressurize the system. Repressurization requires that pressure be built up in all components of all railcars—the brake pipe 18, piston valve 20, and reservoir 22. As pressure in the brake pipe increases, the piston valve 20 changes position such that reservoir 22 is repressurized, and the pressure in the brake cylinder 24 is simultaneously released.

The design of this braking system provides a "failsafe" design because while the brake cylinders operate by means of pressurized air, the system which powers these cylinders is actuated by the release of pressure, not the maintenance of pressure. Thus, a leak anywhere in the system (except in an individual brake cylinder) will automatically cause the brakes to be applied on the entire train. For example, if two connected railcars become uncoupled, the connecting hoses 38 will pull apart, causing the pressure in the brake pipe 18 to be released. This rapid pressure drop will cause the full pressure of the reservoir 22 of each railcar to immediately actuate the brakes on each railcar. It will be apparent that the actuating pressure of the brake cylinder 24 will be something less than the operating pressure maintained in the cylinder 22 because of the need to pressurize a larger volume (both the reservoir 22 and the brake cylinder 24) using the compressed air in the reservoir 22.

However, conventional railroad car braking systems suffer from several problems in their normal operating mode, which adversely affect operation when connected to a lightweight railcar moving vehicle, especially for maintenance work. First, due to the "failsafe" design, it is rather slow to react. Brake actuation is a two step process, requiring the release of pressure from the brake pipe common to all connected railcars before the brake cylinders begin to actuate. This can involve a substantial volume of air, which takes time to release through the single release valve in the locomotive. Additionally, because of this slow reaction time, a train that has just braked to a stop cannot quickly release its brakes and resume movement again. Obviously, this slow braking system reaction time will slow down the work of a maintenance crew.

Moreover, frequent stopping and starting is problematic with conventional railcar braking systems. Each time the brakes are applied, some portion of the compressed air in the system is released. If the brakes are applied several times in close succession, enough of the pressure in the brake reservoirs can be bled away that the brakes become inoperable until the system regains its operating pressure. This can take a substantial amount of time, potentially leaving a moving train without brakes, and possibly creating a "runaway" train. This is a particular nuisance when using a lightweight railcar moving vehicle for maintenance of way operations where very brief stops are required at locations very close together, such as to throw rail switches, or to set out or pick up railroad ties or other track material.

Semi-tractors normally include compressed air systems for powering the brakes of a standard highway trailer. However, these are actuated by means of providing high pressure air, not by releasing it. Accordingly, it is apparent that the respective braking systems of the train and semi-tractor operate in directly opposite manners. Nevertheless, it would be desirable to have a braking system for a lightweight railcar moving vehicle constructed from a conventional semi-tractor, wherein the compressed air system for providing braking power to a highway trailer is adapted to power the braking system of a railroad car, and the braking system for the railcar may be actuated by the same means that actuates the highway trailer brakes on conventional semi-tractor trailer combinations. It would also be desirable for a lightweight railcar moving vehicle to have a braking system that uses the brakes of the railcar, but does not rely on the slow reaction time of the railcar braking system.

It would also be desirable to have a braking system for a lightweight railcar moving vehicle constructed from a conventional semi-tractor, wherein the compressed for braking the semi-tractor and the railcar air is controlled by small, lightweight, components that can be disposed in the cab of the semi-tractor.

SUMMARY OF THE INVENTION

It is therefore an object of the present invention to provide a braking system for a railcar moving vehicle that has been constructed from a semi-tractor, wherein the braking system of the connected railcar is connected to and actuated by the compressed air system of the semi-tractor.

It is another object of this invention to provide a braking system for a railcar moving vehicle wherein the braking system of the connected railcar is actuated by the same means which actuates the trailer brake for a conventional highway trailer.

It is another object of this invention to provide a braking system for a railcar moving vehicle that uses the brakes of the railcar, but does not rely on the slow reaction time of the railcar braking system.

It is yet another object of this invention to provide a braking system for a railcar moving vehicle wherein the braking system of the connected railcar(s) is actuated by an electric switch to control electromechanical valves which regulate the braking force.

It is another object of this invention to provide a braking system for a railcar moving vehicle wherein the braking system of the connected railcar(s) may be actuated by pressing on the brake pedal of the railcar moving vehicle.

The above and other objects are realized in a preferred embodiment of a compressed air braking system for a railcar and railcar moving vehicle combination. The railcar moving vehicle comprises a modified semi-tractor configured to ride on railroad track and couple to a railcar, having a conventional pneumatic braking system for braking itself, and a conventional pneumatic trailer brake system for providing compressed air for actuating the brakes of a highway trailer. In accordance with the invention, the brake line connecting the railcar brake system to the railcar brake cylinder is disconnected, and in its place the trailer brake line is connected directly to the brake cylinder of the railcar, whereby the railcar brakes may be actuated independently or in concert with the tractor brakes by an operator of the modified semi-tractor using either the standard brake pedal or a separate trailer brake lever.

In an alternative embodiment, the modified semi-tractor is provided with a secondary brake system for use in concert with the above mentioned brake system when two or more railcars are coupled to said modified semi-tractor. The previously mentioned brake system is connected to the first railcar, while the secondary brake system provides compressed air to the brake pipes of the second and subsequent attached railcars through the brake pipe of the first railcar. A valve is closed in the system of the first railcar so that the brake pipe of the first railcar is isolated from the modified braking system thereof. A railcar brake controller is provided to allow selective release of air pressure in the brake pipe to actuate the brakes of the second and subsequent railcars in the manner of conventional railcars.

In accordance with another more detailed aspect of the present invention, the braking system may comprise means associated with the railcar moving vehicle for producing compressed air at a desired pressure means for transmitting the compressed air through an outlet conduit to the braking system of the coupled railcar, and brake actuation means whereby the operator of the railcar moving vehicle may selectively release pressure in the outlet conduit to actuate the compressed air brakes of the railcar.

In accordance with another more detailed aspect of the present invention, the means for producing compressed air comprises the air compression system for powering air powered trailer brakes of a standard highway trailer, and the means for actuating the compressed air braking system of the railcar comprises a plurality of electrically controlled valves which allow an operator to selectively release pressure from the braking system. In one embodiment, the means for actuating the compressed air braking system of the railcar is coupled to the actuation means of the standard pneumatic brake system of the modified semi-tractor, whereby the railcar brakes and railcar moving vehicle brakes may be applied simultaneously by operating a single mechanism.

The above and other objects and features of the present invention will be apparent to those skilled in the art, based on the following description, taken in combination with the accompanying drawings.

DETAILED DESCRIPTION

For the purposes of promoting an understanding of the principles of the invention, reference will now be made to the exemplary embodiments illustrated in the drawings, and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

Figure 2:
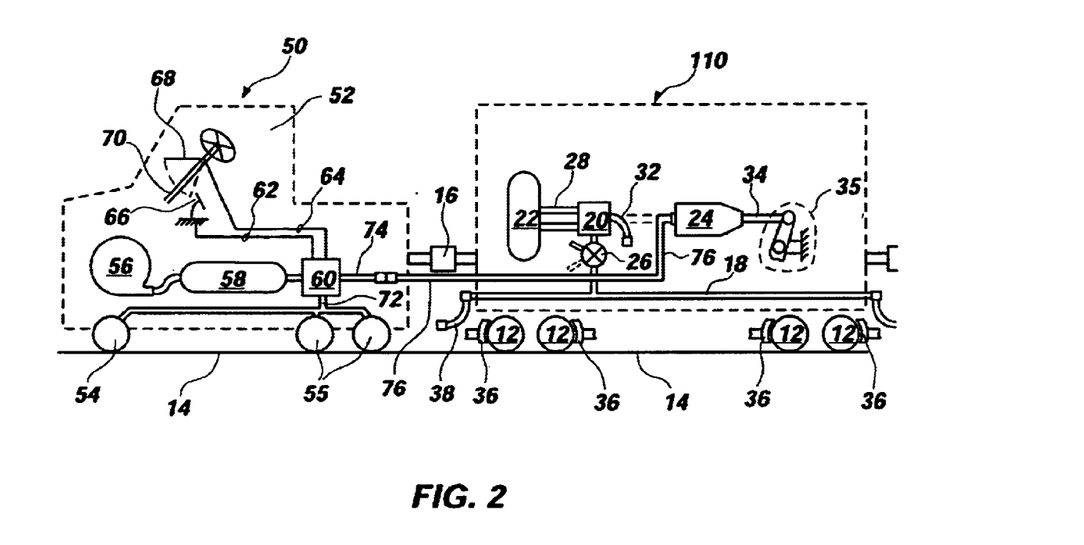
FIG. 2 is a schematic diagram of the railcar braking system of the present invention for use with a modified semi-tractor railcar moving vehicle.

FIG. 2 provides a schematic diagram of a pneumatic railcar braking system according to the present invention. This braking system is configured for use with a modified semi-tractor railcar moving vehicle 50 coupled via coupler 16 to a modified railcar 110. The modified railcar 110 has a braking system substantially similar to that of the standard railcar 10 shown in FIG. 1, which comprises a brake pipe 18, piston valve 20, reservoir 22, and brake cylinder 24. It will be apparent that additional railcars may be coupled to the opposite end of railcar 110 if desired, in the conventional manner. The railcar moving vehicle 50 is a modified semi-tractor having a cab 52, and steel wheels 54 and 55 which are configured for riding on the rails 14. The modified semi-tractor has a conventional pneumatic braking system comprising a compressor 56, master reservoir 58, and controller 60. Typical master reservoirs have a capacity of approximately 100 gallons ($\approx$13.4 ft$^3$), and typical semi-tractor compression systems are capable of attaining a peak pressure of approximately 120 psi.

The controller 60 receives compressed air from the master reservoir 58, and receives control input via electrical, mechanical, or hydraulic linkages 62 and 64 from the semi-tractor brake pedal 66 and trailer brake lever 68. In many semi-tractors the trailer brake lever 68 is conveniently mounted on the steering column 70 as shown in FIG. 2. The controller 60 has a first pneumatic output 72 which communicates with the pneumatic braking actuator (not shown) of each wheel 54 of the semi-tractor for normal braking thereof. The controller 60 also has a second pneumatic output 74 which provides compressed air for actuation of a trailer brake. The brake compressor 56, master reservoir 58, controller 60, first pneumatic output 72, and brake actuators associated with wheels 54 and 55 collectively comprise the tractor braking system. The compressor 56, master reservoir 58, controller 60, and second pneumatic output 74 collectively comprise the trailer brake system.

Figure 5:
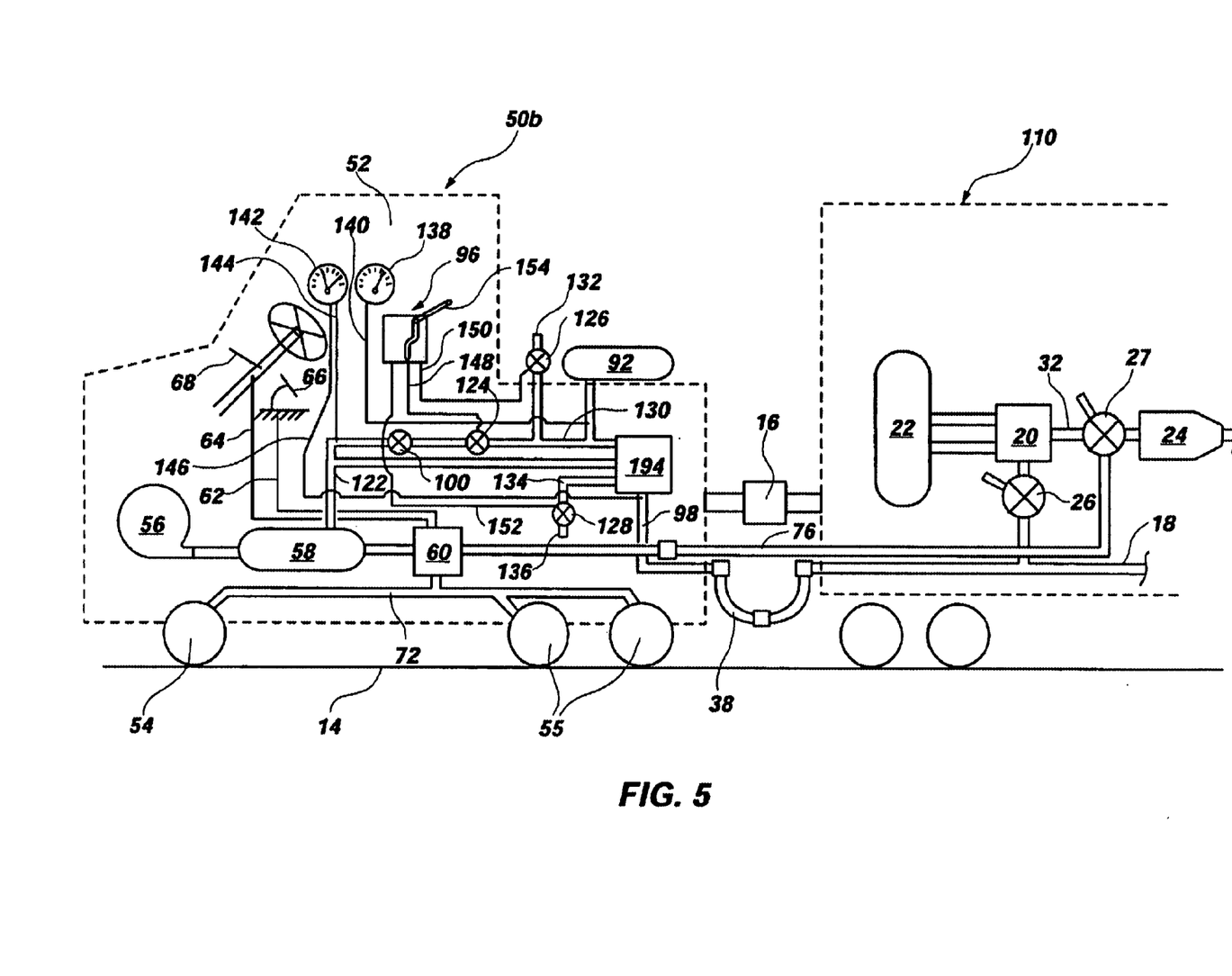
FIG. 5 is a schematic diagram of a railcar braking system according to the present invention.

When operating the semi-tractor in its conventional manner to pull a highway trailer, the second output 74 is connected to the highway trailer to power the brakes thereof. However, in an advantageous feature of the present invention, when the railcar moving vehicle is configured for pulling a railcar as in FIG. 2, conduit 32 which normally supplies compressed air from the railcar reservoir 22 to the railcar brake cylinder 24 is disconnected, and the second output 74 is connected directly to the railcar brake cylinder 24 by hose 76 for directly providing compressed air from the railcar moving vehicle 50 to the railcar brake cylinder. In this configuration, valve 26 is closed, such that the braking system of car 110 does not communicate with the brake pipe 18. It will be apparent that the connecting hose 38 of the brake pipe 18 need not be connected to any compressed air source when the brake cylinder is directly connected to the trailer brake system. Alternatively, as shown in FIG. 5, hose 76 and conduit 32 may both be connected to the brake cylinder via a directional valve 27, which selectively allows air to flow to the brake cylinder from either the railcar reservoir or the trailer brake system. This allows selective reconfiguration of the railcar to utilize either the trailer brake system or the standard brake pipe air supply without requiring any lines or conduits to be disconnected.

It will be apparent to those skilled in the art that various additional components of conventional railroad braking systems such as pressure gauges, pressure release valves, check valves, and so forth, will be employed in the system thus described to create a complete and workable system. Naturally, these additional components may be incorporated in a variety of configurations which will serve the purposes of the present invention. The present disclosure is intended to indicate the essential elements of the invention, without repeating all additional elements which could be included, and are well known in the art.

Returning to FIG. 2, this system advantageously allows the driver of the railcar moving vehicle to directly apply the brakes of the railcar by depressing the brake pedal 66 of the semi-tractor. Alternatively, the driver may apply the brakes of the railcar alone by using the trailer brake lever 68. Because the railcar may weigh much more than the railcar moving vehicle, sufficient braking force may be generated in this manner alone. Using either method, however, the railcar brakes may be actuated in the same manner that truck brakes are actuated, such that an individual with truck driving skills needs no additional training to operate the brakes of the railcar moving vehicle. Additionally, because the semi-tractor's braking system is directly connected to the railcar brake cylinder 24, the reaction of the brakes is much faster, and the brakes may also be released much faster.

Figure 3A:
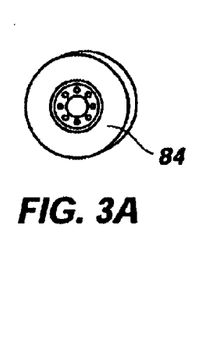
FIG. 3A is a view of an unpowered rubber tired auxiliary wheel.
Figure 3B:
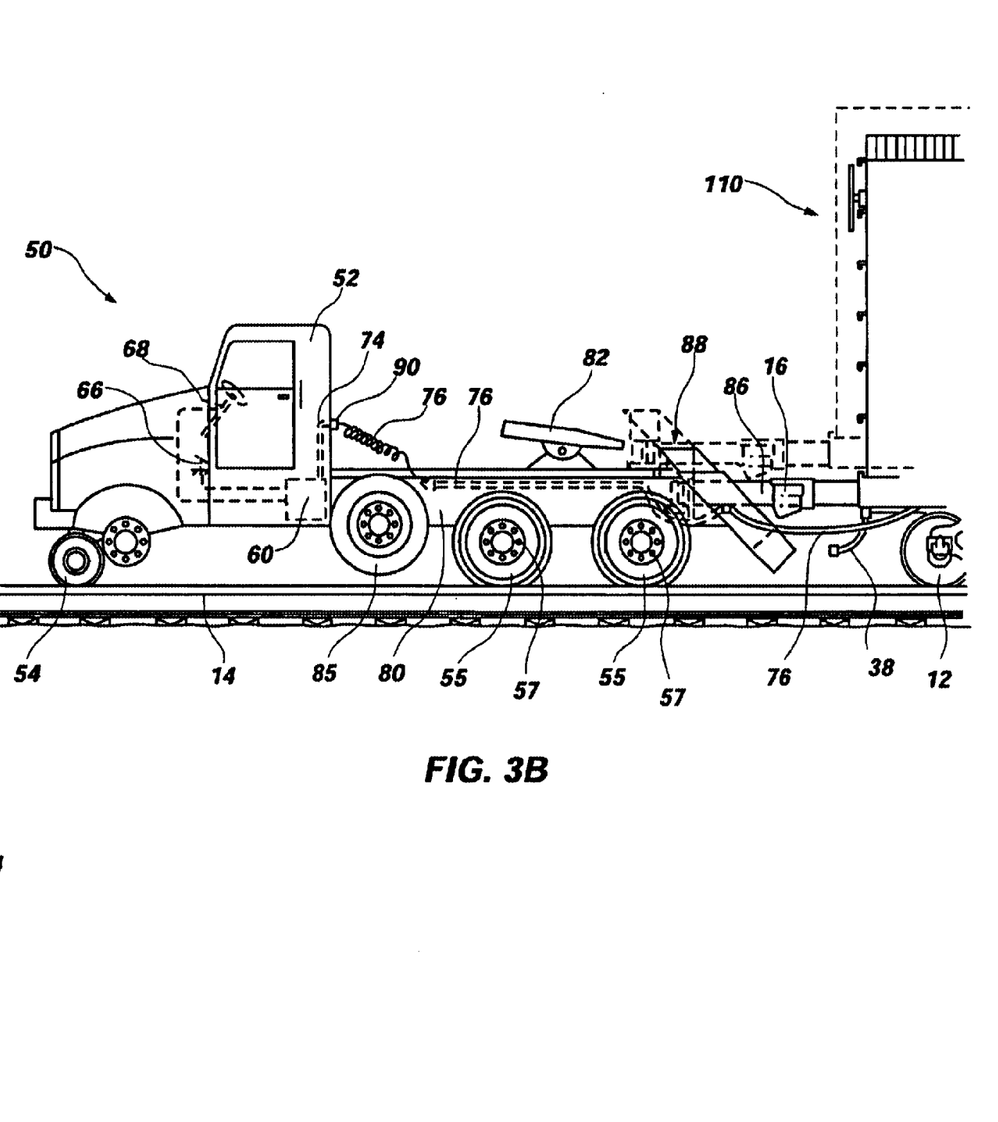
FIG. 3B is a side view of a semi-tractor configured for use as a railcar moving vehicle and coupled to a railcar, and provided with a railcar braking system in accordance with the present invention.

FIG. 3 provides a side pictorial view of the railcar moving vehicle of the present invention. The railcar moving vehicle 50 comprises a modified semi-tractor having an elongate frame 80, a cab 52 housing the truck engine and controls, and standard fifth-wheel assembly 82 for pivotally connecting the tractor to a conventional highway trailer (not shown). However, to function as a railcar moving vehicle, the semi-tractor is provided with drive wheels 55 located toward the rear of the frame 80, and typically smaller guide wheels 54 to support the front of the vehicle. It will be apparent that the drive wheels 55 must be affixed to the drive axles of the tractor so as to propel the vehicle. As shown in FIG. 3A, the vehicle 50 is also provided with unpowered rubber tired auxiliary wheels 85 which are common on large trucks, and which may be selectively raised and lowered by hydraulic or pneumatic means for contact with a roadway so as to spread the weight when the truck is carrying a particularly heavy load. It will be apparent that when configured for use as a railcar moving vehicle, the rubber-tired wheels 84 used for highway operation are removed. The drive wheels include bolts 57 that allow replacement of the rubber-tired wheels onto the drive axles, thus providing a means for selectively installing the rubber tired wheels on the railcar moving vehicle to allow operation of the vehicle as a trailer moving vehicle on roadways.

Attached to the rearward portion of the frame 80, immediately behind the fifth wheel assembly 82, is a coupler 16 and drawbar 86 for coupling to a typical railcar, such as a boxcar 110 as depicted in FIG. 3B. The coupler 16 and drawbar 86 are typically connected to the frame 80 by means of a hydraulic lifting mechanism, indicated generally at 88, which allows an upward force to be applied by the railcar moving vehicle 50 to the front of the railcar 110, so as to transfer a portion of the weight of the railcar 110 to the railcar moving vehicle 50 in order to give the railcar moving vehicle sufficient traction.

The components of the air compression brake system as shown in FIG. 2 are not entirely shown in FIG. 3B. However, the controller 60, the brake pedal 66, and trailer brake lever 68 are schematically shown in this view. On conventional semi-tractors, the second outlet 74 typically terminates in a coupler 90 located on the back of the cab 52. This coupler is designed for the connection of a trailer brake line. In the present invention, hose 76 is connected to coupler 90, and extends backward along the vehicle frame 80 to the railcar 110. There, the hose 76 is connected directly to the brake cylinder 24 of the railcar (not shown in FIG. 3B). As shown in FIG. 3B, the hose 76 is preferably disposed along the inboard side of the frame 80, but may be connected in any suitable manner. It will be apparent that hose 76 must have adequate flexibility to accommodate the motion and variable positions of the hydraulic lift mechanism 88.

Figure 4:
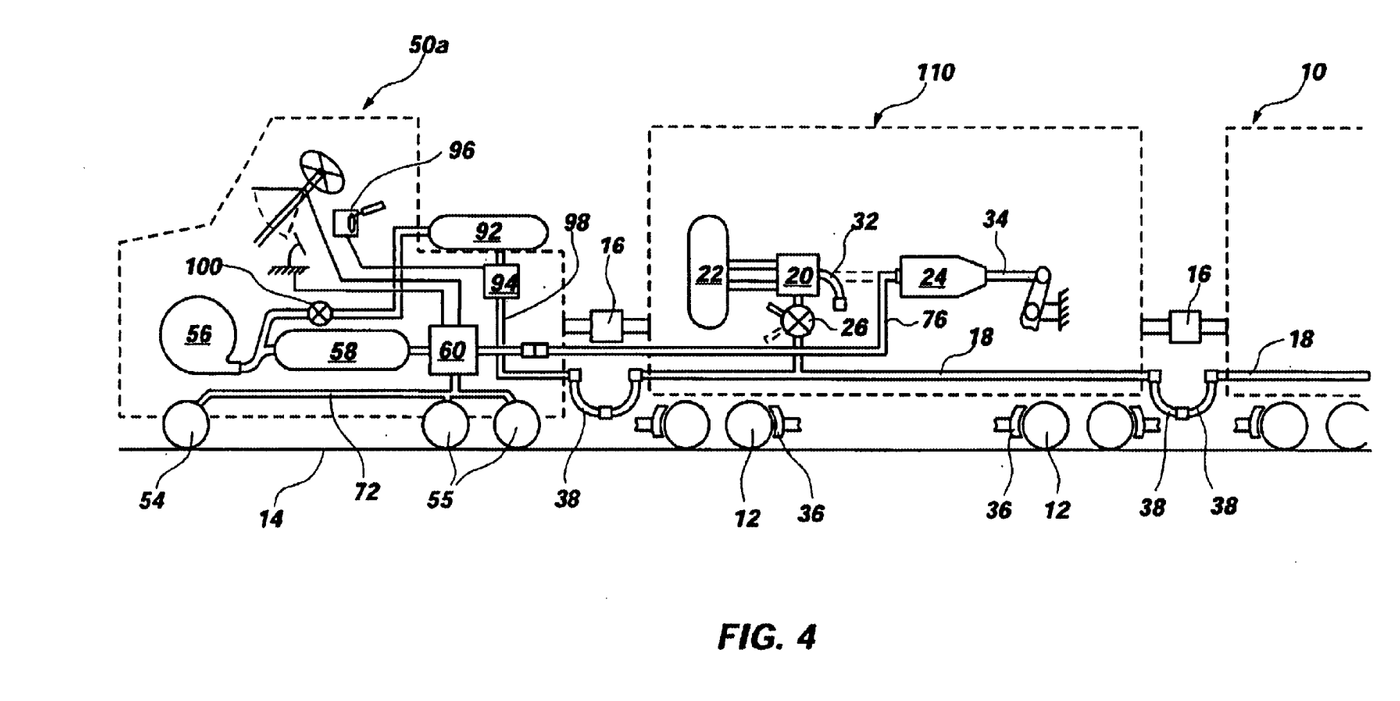
FIG. 4 is a schematic diagram of an alternative embodiment of the railcar braking system of the present invention configured for use with two or more railcars coupled to the railcar moving vehicle.

FIG. 4 is a schematic diagram of an alternative embodiment of the railcar braking system of the present invention. This embodiment is configured for use when two or more railcars are coupled to the railcar moving vehicle. In this embodiment, the railcar moving vehicle 50a is provided with a secondary compressed air system for powering conventional railcar brakes. The system may be powered by the same compressor 56 as the truck brake system, assuming this system has adequate power and capacity. Alternatively, a secondary compressor may be provided for supplying pressurized air to the secondary railcar braking system. If one compressor is used, it is connected both to the main reservoir 58, and a secondary reservoir 92, preferably separated by a check valve 100 or other pressure regulating mechanism to allow different pressures to reside within main reservoir 58 and the secondary reservoir 92.

The secondary reservoir is connected to a secondary controller 94, which receives input from a railroad brake switch 96, located in the cab 52 of the vehicle. The brake switch 96 may comprise a multi-position electrical switch, or may comprise a multiple valve assembly for selectively releasing pressure from the secondary reservoir 92. In the embodiment of FIG. 4, the first railcar is the modified railcar 110 having its brake cylinder 24 directly connected to the truck braking system. However, the second railcar 10 (and subsequent railcars, if any) have a conventional railcar brake system as in FIG. 1, which is powered by the secondary brake system. The secondary controller 94 provides compressed air to line 98, which leads to a connecting hose 38, which in turn connects to the brake pipe 18 of the first railcar 10. However, with the valve 26 of the first railcar in the closed position, the pressure in the brake pipe has no effect on the first car 10. However, the brake pipe 18 of the first car communicates with the brake pipe 18 of the subsequent cars, so as to power the pressurized brake system of those cars as described with regard to FIG. 1.

It will be apparent that the system may be alternatively configured without the connection of the railcar brake cylinder 24 to the trailer brake system of the railcar moving vehicle. Rather, the brake pipe 18 of the first railcar may be connected to the brake pipe outlet line 98, causing it and all connected railcars to be operated by their standard railcar braking systems.

The brake switch 96 will preferably have Run, Brake, and Emergency modes for controlling the railcar brake system for these subsequent cars, similar to the configuration of braking systems in conventional locomotives, as more fully described below. In the Run mode, fall pressure is maintained in the brake pipe 18, which keeps the brakes of railcars 10 disengaged. When the operator moves the brake switch to the Brake mode, pressure is gradually released from the brake pipe 18, to cause the brakes of the second and subsequent cars to engage any desired amount. In the Emergency mode, all pressure is rapidly released from the secondary brake system, causing immediate maximum braking of all connected cars.

Figure 7:
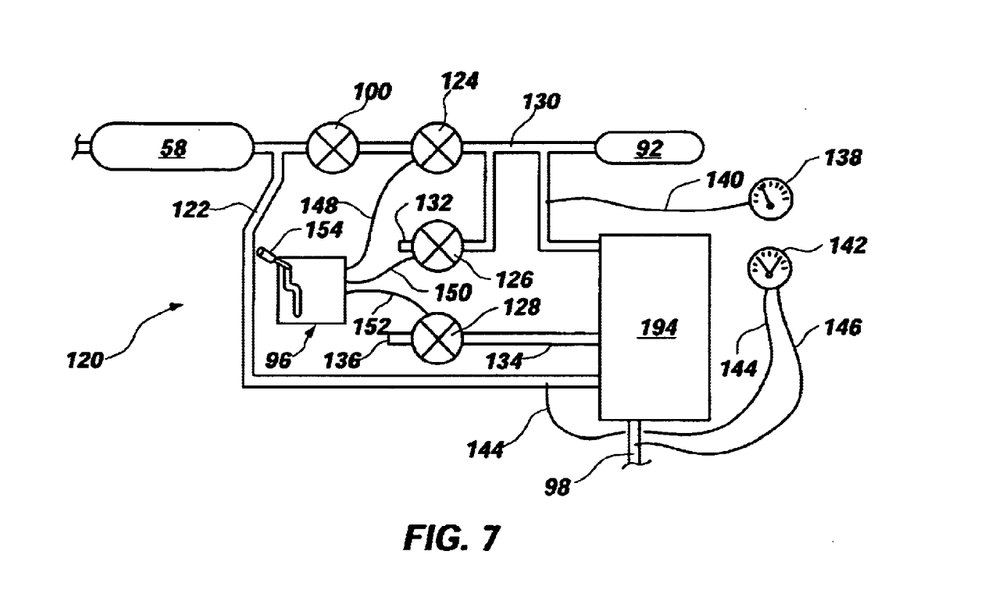
FIG. 7 is a schematic diagram of a portion of the braking system of FIG. 5, showing the electric brake switch, control valves, and other components in more detail.

Referring to FIG. 5 and FIG. 7, there is shown a schematic diagram of an alternative embodiment of a compressed air railcar braking system 120 for a railcar-moving moving vehicle 50b according to the present invention. This alternative system is similar in most respects to the system described above, and utilizes the compressor 56, master reservoir 58, and a secondary control module 194. In this embodiment, the master reservoir outlet line 122 divides into two branches. One branch is a bypass which connects directly to the secondary control module 194, providing the full pressure from the master reservoir to the secondary control module. The other branch extends first through the check valve 100, which reduces the peak pressure of the system. Railcar braking systems typically operate at a running pressure of 90 psi. The check valve 100 is a pressure regulator, which operates to reduce the system pressure from 120 psi (in the master reservoir) to the 90 psi operating pressure of the braking system.

Following the check valve 100, the outlet line 122 encounters the first of three electromechanical valves—a release valve 124, an activation valve 126, and an emergency evacuation valve 128—which together provide some of the operational advantages of the present invention. These valves are solenoid actuated ball valves, which are controlled by the railcar brake switch 96, and in the absence of electric current are normally biased in a closed position. Those skilled in the art will recognize that there are many such valves which are commercially available and will adequately serve the purposes of the present invention. Likewise, other types of valves may be alternatively provided to perform the same functions.

The release valve 124 leads to the secondary control module feed line 130, and is open when the railcar brake switch is in the Run position. When this valve is closed, this isolates the master reservoir 58 from the remainder of the system by closing off the control module feed line at that point. The function and advantages of this arrangement will be more fully apparent hereafter. Beyond the release valve 124, the control module feed line includes a branch which leads to the activation valve 126. The activation valve communicates with an air exhaust port 132, which is open to the atmosphere. In its normally closed position, the air exhaust port 132 of the activation valve 126 prevents the escape of compressed air from the control module feed line.

Another branch of the control module feed line 130 leads to the secondary reservoir 92, which is similar in configuration and function to the auxiliary brake reservoir provided on conventional railcars, as described above. The secondary reservoir functions to provide an additional supply of compressed air and to help moderate pressure spikes in the system. The control module feed line then proceeds to its connection with the secondary control module 194. The control module is a standard locomotive brake controller, such as a 30 CW Relay Module manufactured by Westinghouse Air Brake Co. This control module is a mechanical device, which incorporates a variety of valves, springs, relays, etc. to regulate air flow through various conduits to control the braking system. It will be apparent, however, that comparable electronic or microprocessor controlled devices could also be used to perform the same functions.

The secondary control module 194 includes two compressed air outlets. The first outlet connects via line 134 to the emergency evacuation valve 128, which includes an emergency exhaust port 136. Like the activation valve 126, the emergency evacuation valve 128 is normally closed to prevent escape of compressed air from the system. However, unlike the air exhaust port 132, the emergency exhaust port 136 is designed to allow very rapid release of the entire pressure in the system. As will be described in more detail below, opening of the emergency evacuation valve will quickly evacuate the entire braking system from the activation valve forward, allowing rapid application of maximum braking power in an emergency. A second outlet from the secondary control module connects to the brake pipe outlet line 98, which extends to the rear of the railcar moving vehicle and to an attached railcar, as described above.

A variety of gauges may be incorporated into the system 120 to allow monitoring of its functions and to assist in operation. A first pressure gauge 138 is connected to the control module feed line 130 via line 140 to detect and indicate pressure changes downstream of the release valve 124 and activation valve 126. If the system is functioning properly, this pressure will be the same as that in the brake pipe outlet line 98. The first pressure gauge 138 thus provides the operator with an indication of the operating pressure in the braking system. A second pressure gauge 142 is connected via line 144 to the outlet line 122, to allow the user to monitor the pressure within the master reservoir 58. By careful observation, it will also allow a user to monitor the performance of the compressor and detect leaks or malfunctions in the system. The second pressure gauge may alternatively be a dual readout type, and have a second connection via line 146 to the brake pipe outlet line 98. In this alternative configuration, the operator may advantageously determine both the brake operating pressure, and the master reservoir pressure by observing only one gauge. Other gauges may also be provided.

The control valves 124, 126, and 128 are connected to the railcar brake switch 96 via electrical wires 148, 150, and 152, respectively. The railcar brake switch, shown in more detail in FIG. 6, includes a switch lever 154 which is moveable to three different positions (shown in phantom lines), labeled Run, Brake, and Emergency. The lever 154 also includes push button 156, the function of which will be described hereafter. The switch advantageously incorporates an offset slot 157 in which the brake lever 154 rides. The geometry of this slot provides a central stop 159 against which the brake lever 106 abuts when moved from the Run position to the Brake position. In order to move the brake lever from the Brake position to the Emergency position, the lever 106 must be moved sideways, then down. This configuration helps prevent an operator from unintentionally moving the lever to the Emergency position.

To understand the operation of the braking system 120 and the brake switch 96, it is necessary to recall the mode of operation of railcar brakes. A railcar receives its air supply through its brake pipe, and includes a secondary air reservoir connected to brake cylinders which actuate the brakes on each wheel. A loss or reduction of pressure in the brake pipe causes the railcar brakes to be applied using the air in the secondary air reservoir, in proportion to the pressure reduction in the brake pipe. If the pressure within the brake pipe drops to zero, maximum braking force is applied to bring the car to a stop as quickly as possible.

Figure 6:
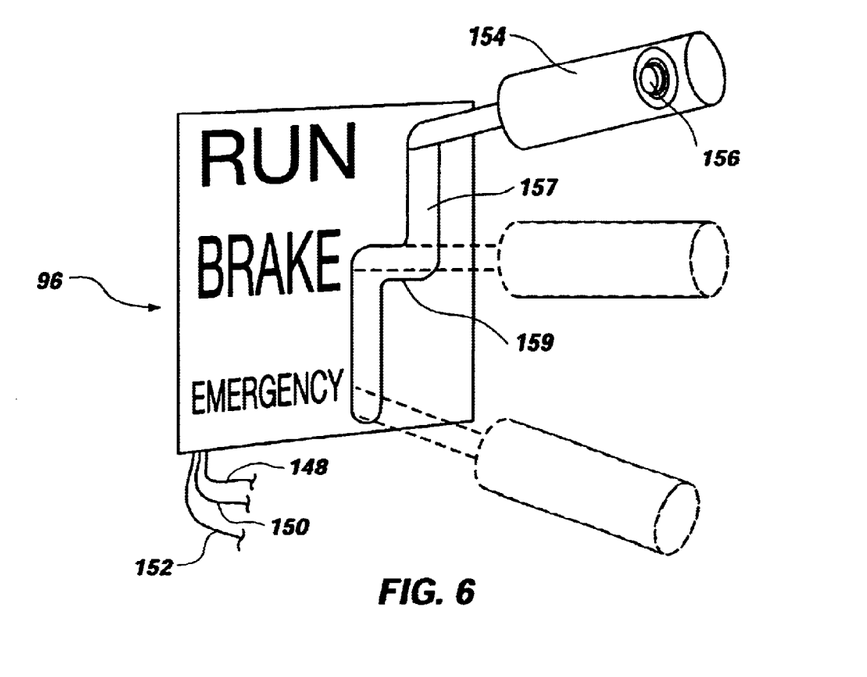
FIG. 6 depicts a three-position braking lever configured for use with the railcar braking system of the present invention.

When the brake lever 154 is moved to the Run position, current is sent through electrical line 148, and causes release valve 124 to open. With release valve 124 open, pressurized air from the master reservoir 58 is allowed to flow through secondary control module feed line 130, secondary control module 194, and into the brake pipe outlet line 98, so as to pressurize the brake pipes and braking systems of all connected railcars to the intended operating pressure (typically 90 psi, as mentioned above) as reduced by the check valve/pressure regulator 100. Only when the entire system reaches operating pressure do the brakes on all attached cars release and allow motion. In order for the train to keep moving, this pressure must be maintained.

When the brake lever 154 is in the Run position, valves 126 and 128 receive no electrical signal, and thus remain unactivated or closed, preventing escape of compressed air. When braking is desired, the operator moves the lever 154 to the middle Brake position. In this position an electrical signal is no longer sent down line 148, causing the release valve 124 to close. This condition isolates the master reservoir 58 from the rest of the system. However, merely moving the lever to the Brake position does not activate the brakes. To apply the railcar brakes, the operator must push button 156, which is only operative when the lever is in the Brake position. Pressing button 156 sends a signal through line 150 to open activation valve 126. When this happens, air is allowed to escape through the air exhaust port 132, causing the pressure in secondary control module feed line 130, and hence the brake pipe outlet line 98 (and the connected brake pipes of any attached railcars) to drop. This causes the railcars to apply braking force as described above. When the button 156 is released, activation valve 126 then reverts to its closed position. This maintains the reduced pressure level in the brake pipe outlet line and brake pipes, but nothing more. To repressurize the system, the brake lever must be moved back to the Run position.

This configuration provides several advantageous features for safety and convenience. The push button 156 makes the braking system convenient to operate, but helps prevent inadvertent release of pressure from the brake system. Because the button 156 is only operative when the brake lever 154 is in the Brake position, an operator cannot unintentionally apply the brakes when grasping the lever in some other position. At the same time, with the brake lever in the Brake position, the status quo is maintained, whether that is a condition of being stopped, braking at some constant rate, or running with no brakes applied.

During braking, an operator can monitor operation of the system by observing the pressure gauges 138 and 142. The operator can monitor the magnitude of pressure change in the brake pipe outlet line 98 via second pressure gauge 142. It will be apparent, however, that a change in pressure in the brake pipe outlet line and connected brake pipes will be slower than the same pressure change in the secondary control module feed line 130. Advantageously, the operator may observe, via the first pressure gauge 138, the pressure change in the secondary control module feed line 130, and release the button 156 when a desired pressure drop has been reached. Then, after some brief time, the pressure in the brake pipe outlet line and brake pipe will drop down to match that in the brake pipe outlet line. For example, where the operating pressure of the system is normally 90 psi, the operator may hold the button until the first pressure gauge 138 indicates that the pressure has dropped to 80 psi. Gradually, the pressure in the brake pipe outlet line 98, as indicated by the second pressure gauge 142, will also drop to 80 psi. This will cause each attached railcar to apply some uniform braking force, causing the train to slow. If the operator then leaves the brake lever in the Brake position after releasing the button, the braking force will be maintained, possibly eventually stopping the entire train. It will be apparent that the operator could press the button 156 again, releasing more pressure, and increasing the braking force, if desired. Additionally, it will be apparent that the brakes will normally be left in the activated condition when the train is stopped.

Because the release valve 124 is closed when the lever is not in the Run position, full pressure is maintained in the master reservoir 58 when the brakes are applied. During braking the operator can conveniently monitor the maintenance of pressure in the master reservoir by observing the second pressure gauge 142. When the operator moves the lever 154 back to the Run position following any amount of braking, or even a complete stop, the release valve 124 will reopen, causing the stored air in the master reservoir 58 to flow back into the system to repressurize it. This may take some time, depending on the length of the train, the magnitude of the brake application, the size of the master reservoir, and the pressure of the air therein. However, upon regaining operating pressure, the train will again be able to run freely, without any braking resistance.

When the operator moves the brake lever 154 to the Emergency position, an electrical signal is sent through line 152 to the emergency evacuation valve 128, causing that valve to open. This causes what is referred to as an emergency "explosion." Opening of valve 128 causes the air pressure in the brake pipe outlet line 98 to escape rapidly, almost explosively, to cause all attached railcars to immediately apply maximum braking force for an emergency stop. Again, as in the case of normal braking described above, because release valve 124 is closed when the brake lever is not in the Run position, pressurized air is not released from the master reservoir 58 when the brakes are applied. Consequently, the compressor will not tend to "fight" to maintain operating pressure during braking. Only after the braking operation will the system respond to restore the lost pressure.

The railcar moving vehicle described herein is very economical because it may be used both on and off of the rails. Also, because it is a modified semi-tractor, rather than a limited production specialty vehicle, the economics of mass production help to keep its cost relatively low. Greater advantages, however, are the avoidance of the need to provide an additional compressor system to power the brakes of a railcar, and the use of the conventional truck braking control mechanisms located in the cab of the semi-tractor, or, alternatively, the provision of a compact, lightweight, inexpensive electronic brake switch, which may be conveniently mounted in the cab of the semi-tractor to control electromechanical valves for controlling the brakes of the railcar(s). These controls allow an operator to safely and easily apply the brakes of a railcar to provide more effective braking with a lightweight railcar moving vehicle. In addition, the hybrid embodiment utilizing a secondary pneumatic system allows the railcar brakes of a second and subsequent coupled railcars to be operated by the operator of the railcar moving vehicle.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements. Thus, while the present invention has been shown in the drawings and fully described above with particularity and detail in connection with what is presently deemed to be the most practical and preferred embodiment(s) of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims.

What is claimed is:

1. A braking system, for a railcar and railcar moving vehicle, comprising:
   a railcar moving vehicle, comprising a modified semi-tractor configured to ride on railroad track and couple to a railcar, the modified semi-tractor including:
      a tractor brake system, for braking the modified semi-tractor;
      a railcar brake system, including means for producing compressed air and maintaining a volume of compressed air at a pressure suitable for actuating brakes of a railcar;
      a railcar brake actuator, for actuating the railcar brake system, the railcar brake actuator comprising a plurality of electrically operated valves, configured to allow selective release of pressure from the brake pipe outlet line, and a switch for activating said plurality of valves;
   at least one railcar, coupled to the modified semi-tractor, having compressed air actuated brakes and a brake pipe;
   a brake pipe outlet line, for transmitting compressed air from the railcar brake system to the brake pipe of the at least one railcar, whereby an operator of the modified semi-tractor may actuate the brakes of the at least one railcar by manipulating the railcar brake actuator;
   a control module, in fluid communication with the brake pipe outlet line; and
   a control module feed line, in fluid communication with the means for producing compressed air and maintaining a volume of compressed air, configured for transmitting compressed air to the control module; and
   wherein the plurality of electrically operated valves include
      a release valve, disposed in the control module feed line, said release valve being moveable from a closed position, to an open position in which compressed air is allowed to flow to the control module;
      an activation valve, in fluid communication with the control module feed line between the release valve and the control module, said activation valve having an air outlet and being moveable from a closed position, to an open position in which the air outlet conduit is open, so as to allow compressed air to escape; and
      an emergency evacuation valve, in fluid communication with the control module, having an emergency exhaust port, and being moveable from a first closed position in which the emergency exhaust port is closed, to a second position in which the emergency exhaust port is open, to allow air to rapidly escape from the railcar braking system.

2. The braking system as described in claim 1, wherein the switch is an electrical switch, comprising:
   a switch lever, having:
      a run position, wherein the release valve is open, and both the activation valve and the emergency evacuation valves are closed;
      a brake position, wherein the release valve is closed, the activation valve is openable, and the emergency evacuation valve is closed; and
      an emergency position, wherein the release valve is closed, the activation valve is closed, and the emergency evacuation valve is open, whereby all pressure is rapidly released from the brake system; and
   a push button, which, when depressed when the switch lever is in the brake position, causes the activation valve to open.

3. The braking system as described in claim 2, wherein the push button is disposed upon the switch lever.

4. The braking system as described in claim 1, wherein the plurality of electrically operated valves comprise solenoid actuated ball valves.

5. The braking system as described in claim 1 wherein the means for producing compressed air and maintaining a volume of compressed air at a pressure suitable for actuating brakes of a railcar comprises an air compression system for powering air powered trailer brakes of a standard highway trailer.

6. The braking system as described in claim 1 wherein the railcar moving vehicle is a modified semi-tractor having a standard fifth wheel connector for connection to a standard highway trailer.

7. The braking system as described in claim 6, further comprising means for selectively installing rubber tired wheels on the railcar moving vehicle to allow operation of the vehicle as a trailer moving vehicle on roadways.

8. A braking system, for a railcar and railcar moving vehicle, comprising:
   a railcar moving vehicle, comprising a modified semi-tractor configured to ride on railroad track and couple to a railcar, the modified semi-tractor including:
      a tractor brake system, for braking the modified semi-tractor;
      a railcar brake system, including means for producing compressed air and maintaining a volume of compressed air at a pressure suitable for actuating brakes of a railcar;
      a railcar brake actuator, for actuating the railcar brake system;
   a first and second railcar, the first railcar being coupled to the modified semi-tractor, and the second railcar being coupled to the first railcar, the first and second railcars each having compressed air actuated brakes and a brake pipe;
   a brake cylinder associated with the brakes of the first railcar;
   a brake pipe associated with the second railcar;
   a brake pipe outlet line, in fluid communication with the brake pipe of the second railcar, for transmitting compressed air from the railcar brake system to the brake pipe of the second railcar, and is not configured to provide compressed air to the brakes of the first railcar, whereby an operator of the modified semi-tractor may actuate the brakes of the second railcar by manipulating the railcar brake actuator;

a trailer brake system, including means for producing compressed air and maintaining a volume of compressed air at a pressure suitable for actuating brakes of a highway trailer; and a coupling line for transmitting compressed air from the trailer brake system directly to the brake cylinder of the first railcar; and a string of one or more additional railcars coupled to the second railcar, each of said additional railcars including:

compressed air actuated brakes; and a brake pipe configured for transmitting compressed air from the brake pipe of a preceding railcar to a following railcar, whereby an operator of the modified semi-tractor may simultaneously actuate the brakes of said second railcar and said string of one or more additional railcars by manipulating said railcar brake actuator.

9. The braking system as described in claim 8, further comprising a trailer brake lever for actuating the trailer brake system.

10. The braking system as described in claim 8, further comprising a dual actuating device for simultaneously actuating the trailer brake system and the tractor braking system.

11. The braking system as described in claim 10, wherein the dual actuating device comprises a brake pedal located in a cab of the modified semi-tractor.

12. The braking system as described in claim 8, wherein (a) the means for producing compressed air and maintaining a volume of compressed air at a pressure suitable for actuating the brakes of a railcar associated with the railcar brake system, and (b) the means for producing compressed air and maintaining a volume of compressed air at a pressure suitable for actuating the brakes of a highway trailer associated with the trailer brake system comprise: a single system for producing compressed air and maintaining a volume of compressed air at an elevated pressure.

13. The braking system as described in claim 12, wherein the single system for producing compressed air and maintaining a volume of compressed air at an elevated pressure further comprises:

an air compressor powered by said modified semi-tractor; and a master reservoir in fluid communication with said air compressor for receiving and storing compressed air therefrom.

14. A compressed air braking system for a railcar moving vehicle comprising a modified semi-tractor configured to ride on railroad track and couple to a railcar having compressed air actuated brakes, said braking system comprising:

an air compressor;

a master reservoir, connected to the compressor, for receiving and storing compressed air therefrom;

a first controller, in fluid communication with the master reservoir;

a secondary control module, in fluid communication with the master reservoir;

a pressure regulator, disposed between the master reservoir and the secondary control module, configured to reduce the pressure of air which is communicated to the secondary control module;

a release valve, disposed between the pressure regulator and the secondary controller, being moveable from a first closed position, to a second open position wherein air is allowed to pass through the release valve to the secondary control module;

an activation valve, having an air outlet, disposed between the release valve and the secondary control module, the activation valve being moveable from a first closed position, to a second open position in which the air outlet is open so as to allow compressed air to escape;

an emergency evacuation valve, having an emergency exhaust port, in fluid communication with the secondary control module, being moveable from a first position in which the emergency exhaust port is closed, to a second open position in which the emergency exhaust port is open, so as to allow rapid release of all pressure from the braking system;

a brake pipe outlet line, in fluid communication with the secondary control module, configured for conveying compressed air to a coupled railcar, and having at least one quick-disconnect coupler for connecting to the coupled railcar;

a control switch, electrically connected to the release valve, the activation valve, and the emergency evacuation valve, the control switch comprising:

a moveable switch lever, having:

a run position, wherein the release valve is open, and the activation valve and emergency evacuation valves are closed;

a brake position, wherein the release valve is closed, the activation valve is openable, and the emergency evacuation valve is closed; and an emergency position, wherein the release valve is closed, the activation valve is closed, and the emergency evacuation valve is open, whereby all pressure is rapidly released from the brake pipe outlet line; and a push button, which, when depressed when the switch lever is in the brake position, causes the activation valve to open, so as to release pressure from the brake pipe outlet line.

* * * * *